Nov. 24, 1970 F. HOLPER 3,543,064
MOTOR FOR DRIVING FLEXIBLY COUPLED GEARS
Filed Oct. 7, 1968 2 Sheets-Sheet 1

INVENTOR.
FRANK HOLPER
BY
Hinger Dow and Zickert
ATTORNEYS

Nov. 24, 1970   F. HOLPER   3,543,064
MOTOR FOR DRIVING FLEXIBLY COUPLED GEARS
Filed Oct. 7, 1968   2 Sheets-Sheet 2

INVENTOR.
FRANK HOLPER
BY
*Kinzer Dorn and Zickert*
ATTORNEYS

United States Patent Office 3,543,064
Patented Nov. 24, 1970

3,543,064
MOTOR FOR DRIVING FLEXIBLY COUPLED GEARS
Frank Holper, Cary, Ill., assignor to Molon Motor & Coil Corp., Rolling Meadows, Ill., a corporation of Illinois
Filed Oct. 7, 1968, Ser. No. 765,526
Int. Cl. H02k 7/10
U.S. Cl. 310—83    9 Claims

ABSTRACT OF THE DISCLOSURE

An induction motor rotates a drive gear. Assembly shafts are on opposite sides of the drive gear. Each shaft supports coaxially an intermediate gear and a transmitting gear as a set. The two transmitting gears mesh with and drive an output gear. The gears of at least one set (and preferably the gears in each set) are freely mounted on the related shaft and are flexibly coupled as by a torsion spring so that the intermediate gear turns its transmitting gear by means of the flexible coupling. The shafts are also used to hold the motor parts together.

This invention relates to the construction of a small induction motor able to produce high torque with plastic gears.

Small induction motors are employed in vending machines, photocopy machines, television tuning systems and in many other arrangements where a shaft is to be rotated under low torque demands. Thus, the final driven member, the member positioned by the shaft, may be a small valve in a vending machine, a small blower in a photocopy machine, or a variable resistor of some kind. The device to be positioned or set is not very big and little torque is required.

Nonetheless, if efficiency of torque transmission can be enlarged without selecting a more powerful motor, and at a cost factor which justifies the attainment of enhanced torque efficiency, then a superior transmission system has been realized, and so to do is the primary object of the present invention achieved through a unique arrangement of gears, gear coupling and gear supports which reduce bearing wear, enable inexpensive self-lubricating gears of the plastic type to be used, and allow greater tolerance in gear tooth dimensioning. Singly and collectively, these results mean better torque transmission for a motor of given capacity.

Other and equally important objects of the present invention are to produce a motor and gear combination in which the gear support shafts are themselves used to support the stator construction of the motor, and to do this in such a fashion that rotor shafts of motors of identical construction can be joined end to end in tandem; to so construct and arrange the parts that the motor construction itself encourages a circulating stream of air for cooling, thereby preserving motor efficiency, and in this same connection to enable an air gap to be easily realized between the core and coil of an induction motor.

Other and further objects of the present invention will be apparent from the following description and claims and are illustrated in the accompanying drawings which, by way of illustration, shows a preferred embodiment of the present invention and the principles thereof and what I now consider to be the best mode in which I have contemplated applying those principles. Other embodiments of the invention embodying the same or equivalent principles may be used and structural changes may be made as desired by those skilled in the art without departing from the present invention.

Figure 1:
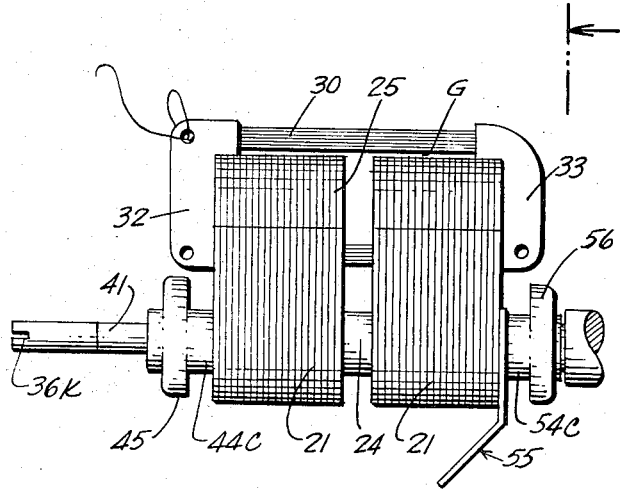
FIG. 1 is a side elevation of a motor constructed in accordance with the present invention.
Figure 2:
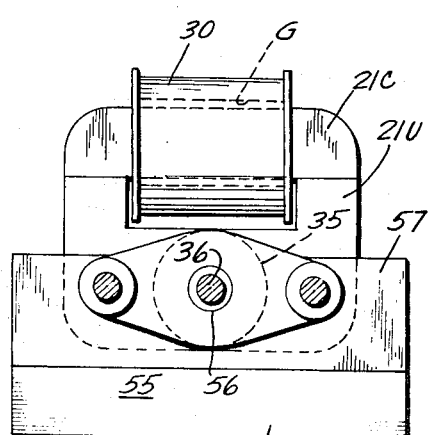
FIG. 2 is an end elevation substantially on the line 2—2 of FIG. 1.
Figure 3:
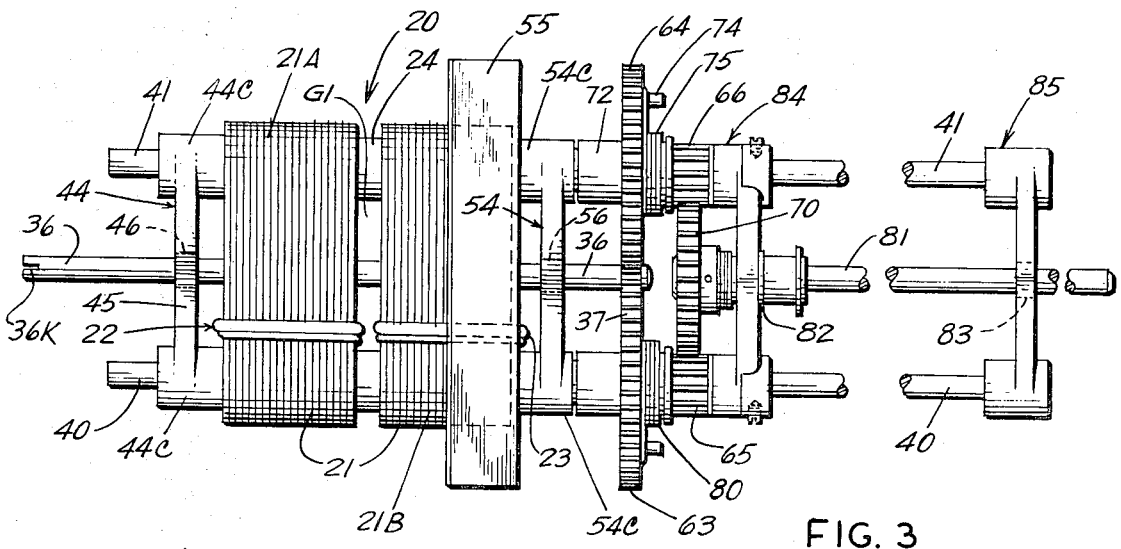
FIG. 3 is a bottom plan view of the motor, and includes the gear system of the present invention.

Referring to FIG. 3 which is a bottom plan view of the apparatus as a whole, FIG. 3 being based on FIG. 1 but including additional parts, the apparatus comprises an induction motor 20 characterized by a stator frame 21, preferably comprising two seperate sets or stacks of laminations (plates) 21A and 21B, as will be apparent in FIGS. 1 and 3, and each having its own shading coil 22 and 23 respectively. The frame units are separated by spacers 24. The frame presents at the same time a laminated core 25 which fits the core aperture presented by the induction motor coil 30. Thus, the laminae may be conventional, FIG. 2, each having a U-shaped element 21U joined to a straight core element 21C, the latter extending through the coil.

The coil 30 will be described in more detail hereinafter, is wound on a split bobbin presenting bobbin end elements 32 and 33, the coil being so wound thereon as to present an air grap G, FIG. 1, between the core 25 and the windings of the coil.

The U-shaped laminae 21N of the frame, FIG. 2, are bored axially, as is customary, to afford a housing for the motor rotor 35 such that when the coil is energized to establish the magnetic field in the frame, the rotor 35 is driven to impart rotary motion to its rotor shaft 36 which carries a drive gear 37 at one end. It will be appreciated of course that the present construction in principle is double duty in that there will be two rotors as 35 associated with each of the frame units 21A and 21B. Moreover, as will be apparent in FIG. 3, the rotor shaft 36 is relatively long, extending outboard of the frame at one end to present the gear 37 and extending outboard of the frame at the opposite end to present a key slot 36K by means of which it is possible to couple a second motor apparatus to the unit 20 shown in FIG. 3.

Under and in accordance with the present invention the two stacks comprising the stator frame 21 are held in rigid assembly by means including a pair of mounting shafts 40 and 41. These shafts extend through guide openings in the laminae which form the frame 21. As shown in FIG. 3, the shafts 40 and 41 are relatively long in nature; they not only constitute locating and fastening members for the two stacks of frame laminae, but also define gear centers, afford bearing supports and serve to enable the motor apparatus ase a whole to be rigidly supported in its position of utility.

In connection with the foregoing, it may first be observed that the spacers 24 referred to above supporting the two stacks of laminae are mounted on the pins 40 and 41. The stack of laminations 21A, FIG. 3, adjacent the key slot 36K are held in a tight assembly against the spacers 24 by a bearing bracket 44. The bearing bracket 44 is a one-piece die casting having a pair of bosses or end collars 44C mounted concentrically on the shafts or pins 40 and 41, and these collars in reality are end stops which cooperate with the spacers 2 to hold tightly together the stack 21A.

The stop collars 44C are joined by an integral bracer or cross strap 45 which serves to mount a bearing 46 for the rotor shaft 36. The bearing bracket 44 as thus constituted and arranged may be held in its operative position shown in FIG. 3 by suitable set screws or other retaining elements constituting no part of the present invention.

In like manner, a bearing bracket 54 is interposed between the lamination stack 21B and the drive gear 37. Again, the bearing bracket 54, like the bearing bracket 44, comprises a pair of end collars 54C which cooperate with the spacers 24 to hold in tight assembly the laminae which afford the stack 21B; and the collars 54C are joined by an integral strap 55, FIG. 2, which houses a bearing 56 for the rotor shaft 36.

Thus it will be seen that the construction as so far disclosed is one characterized by a pair of through-shafts which penetrate and extend outboard from both sides of the laminated frame of the induction motor. These shafts concentrically support stops and spacers which hold together the frame laminae and support a pair of bearings for the rotor shaft 36 whereby the latter will be held straight free of wobble at all times. Additionally, the construction in terms of the coil and core is such that the air gap G is provided as well as an air gap G1 between the stacks 21A and 21B, spaced axially by the spacers 24, resulting in cooler performance.

In this connection it is significant to note that a baffle 55, FIGS. 1, 2 and 3, is clamped in position between the end stops 54C and outer lamination in the stack 21B. The baffle 55 includes a pair of legs 56 and 57, FIG. 2, and a bight or strap 58 so configured and arranged as to afford an opening or passage 59 by which a draft of any air in motion is directed to the front bearing 56 to maintain the bearing cool. As shown in FIG. 1, the bight or cross plate 58 of the air baffle is inclined rearwardly in the direction of the key slot 36K.

In effect, the construction exposes more surface area for cooling, and a concentrated draft is directed to the bearing 56.

Under and in accordance with the present invention, the drive gear 37, FIG. 3, is meshed with a pair of intermediate gears 63 and 64. The form of gear teeth may vary, and in fact the gearing may be helical, but in any event the gears 63 and 64 are respectively supported for rotation on the pins or shafts 40 and 41. Each intermediate gear is coupled to a related transmitting gear 65 and 66, and these two gears in turn are meshed with and drive an output gear 70. The present invention, for reasons to be explained, makes it possible to use inexpensive, self-lubricating plastic gears.

Figure 4:
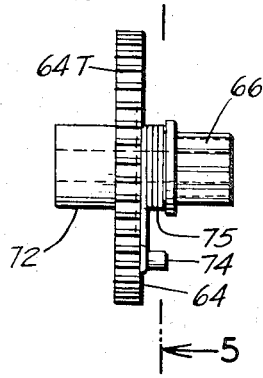
FIG. 4 is a detail view of two related coaxial gears.
Figure 5:
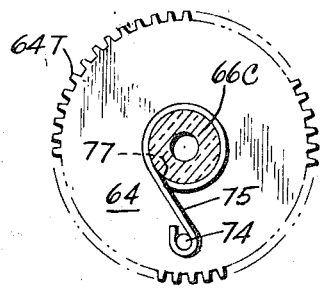
FIG. 5 is a view on the line 5—5 of FIG. 4.

The gears 63 and 64 are identical in construction. This is equally true of the gears 65 and 66. Referring to FIGS. 4 and 5, the gear 64 is of any preferred plastic material, and includes a ring of teeth 64T and a collar or hub 72 bored to fit the shaft 41 for free rotation relative thereto.

The related gear 66 is also of plastic material, and the gear 66 is also provided with a bore so that it may be independently and freely supported on the shaft 41. What has thus far been described in connection with gears 64 and 66 supported on shaft 41 is equally true of gears 63 and 65 supported on shaft 44, and the manner in which the intermediate gear is coupled to its related transmitting gear applies to both gear sets 64–66 and 63–65.

Thus as shown in FIGS. 4 and 5, the intermediate gear 64 on its outer face is formed with a pin 74. A torsion spring 75 is anchored at one end on the pin 74, is wound about a sleeve portion 66C of gear 66 and its opposite end 77 is anchored in an aperture in the sleeve 66C of gear 66, whereby the torsion spring 75 constitutes a flexible coupling between the two related bears 64 and 66 as one set. It will thus be seen that when gear 64 is driven in a direction which constitutes the winding or tensioning direction of spring 75, the latter will carry gear 66 along and in fact the torsion spring 75 constitutes a flexible drive connection between gears 64 and 66. Gears 63 and 65 are flexibly coupled in an identical fashion by a torsion spring 80, FIG. 3.

As explained above, the transmitting gears 65 and 66 are meshed with the main output gear 70, and this gear may also be formed of inexpensive self-lubricating plastic. The output gear 70 drives an output shaft 81, and the output shaft 81 is supported for rotation in a pair of bearings 82 and 83 respectively mounted in bearing brackets 84 and 85, in turn supported on the shafts 40 and 41 in all respects essentially the same as the bearing brackets 44 and 54 described above. It will, therefore, be seen that indeed the shafts 40 and 41 constitute a significant structural feature of the present invention.

While it is preferred that each of the gear sets identified above include a flexible coupling, it is possible, in realizing the results of the present invention, to have only one of the gear sets flexibly coupled. In any event, it will be recognized in the first place that greater torque efficiency is realized in driving the output gear 70 from both sides so to speak through the transmitting gears 65 and 66 meshed therewith. Ordinarily such an arrangement would require a great deal of precision in the teeth of the gears, hardly justifying the cost factor. However, this difficulty is avoided by flexibly coupling the intermediate gear, as 63 and 64, to its related coaxial transmitting gear 65 or 66. In fact, the permissible tolerance is as much as one-half gear tooth which is a very wide tolerance; which is to say that gear 63 or 64 may lead or trail one another by as much as one-half tooth, and any slack or lost motion is absorbed by the corresponding torsion spring 75 or 80. In other words, any discrepancy in the dimension of the teeth of the gears 63 and 64, or 65 and 66 for that matter, is wholly cancelled by the flexible connection between the two related coaxial gears. A bonus is realized by the fact that less expensive plastic gears of self-lubricating nature may be used. Moreover, each spring 75 and 80 allows balanced torque to be transmitted to the output gear 70, taking side thrust off the bearings 56 and off the bearing 82. Bearing life is therefore increased, and since there is no bearing side thrust, it follows that torque efficiency is that much better. It should also be recognized that an additional cost advantage is that one coil, 30, is used in effect to service two frames 21A and 21B.

The air gap G presented between the coil and the core of the stator is unusual. It is attained in an unusual way as will now be described in connection with FIGS. 6 through 9.

Figure 6:
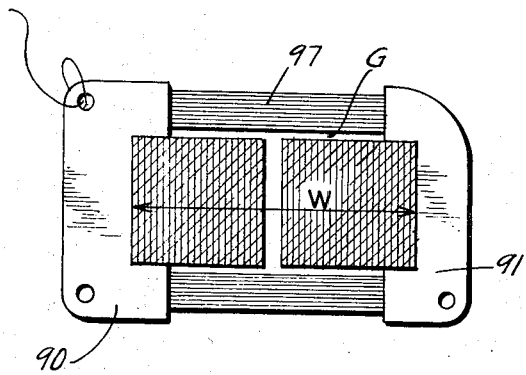
FIGS. 6 through 8 are views showing how the coil is constructed to present an air gap for the core in accordance with the present invention.
Figure 7:
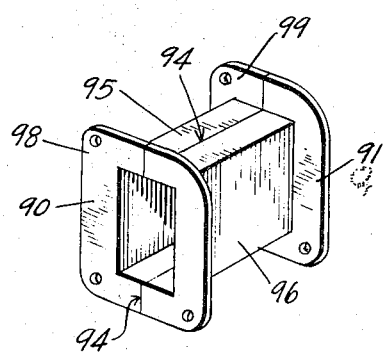

The coil, FIG. 6, comprises a bobbin presented by a pair of spaced apart bobbin end sections 90 and 91. In fact, these end sections 90 and 91 are themselves afforded by splitting, FIG. 7, a one-piece bobbin 92 as purchased, the bobbin 92 being split into two halves along a parting line 94 which is parallel to its longitudinal axis.

Figure 8:
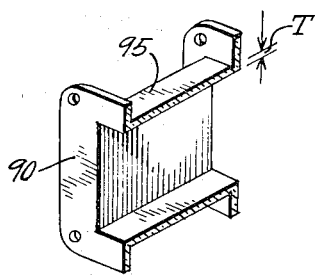
Figure 9:
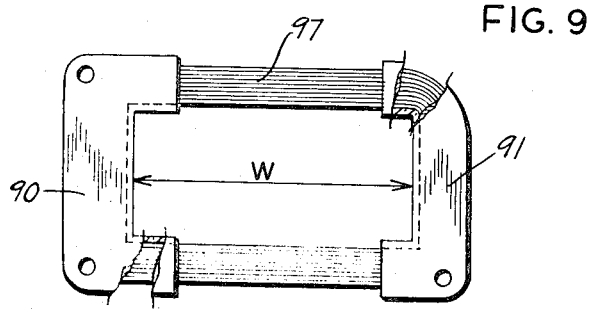

The split halves as thus afforded are then separated and spaced one from another, FIG. 9, by a distance W corresponding to the length of the core of the stator. The dimension W is the distance separating the opposed inside surfaces of the sleeves 95 and 96 of the bobbin end sections, and in this connection, as shown in FIG. 8, each bobbin sleeve is of predetermined thickness T. The air gap G has a dimension the same as T.

When winding the wire 97, FIGS. 6 and 9, about the bobbin end sections, the end sections are accurately spaced and supported in any desired fashion to maintain the dimension W, FIG. 9. The sleeves 95 and 96 are substantially U-shaped, but this shape is only descriptive, not limitative. In any event, the wire 97 is wound tightly about the outer surfaces or sides of the sleeves 95 and 96 between the bobbin flanges 98 and 99. The resulting structure is dipped in an appropriate cement or coating which in effect bonds the windings 97 to the bobbin end sections 90 and 91 resulting in a rigid coil structure affording the air gap G for the core of the motor stator.

It will be seen from the foregoing that under the present invention torque of high efficiency is delivered by a relatively small motor driving gears of plastic material, and this is made possible by the gear arrangement as it is illustrated in FIG. 3. Additionally, a coil of unique structure is presented, and the apparatus as a whole is so constructed as to enable efficient cooling to be realized.

Hence, while I have illustrated and described a preferred embodiment of my invention, it is to be understood that this is capable of variation and modification within the purview of the following claims.

I claim:

1. In a motor having a coil for a stator, and a drive gear on a rotor shaft, the rotor shaft being supported in a bearing which is outboard of the motor, a pair of parallel shafts each supporting coaxially an intermediate gear and a transmitting gear as a set, one on each side of said drive gear, each intermediate gear being meshed with said drive gear to be driven thereby, the gears in at least one of the sets being supported freely for rotation on their shafts, coupling means coupling the gears in each set, said coupling means for said one such set being a resilient means having opposite ends joined to the gears of said one set to flexibly transmit the torque of the intermediate gear to the transmitting gear of said one set, and said transmitting gears being on opposite sides of and meshed with an output gear on an output shaft.

2. A motor according to claim 1 in which the gears in both sets are freely mounted on their shafts and each flexibly coupled in the manner of said one set and the resilient means being a torsion spring.

3. A motor according to claim 1 in which the stator of the motor is of laminated plates, said shafts projecting through and supporting said plates in assembled relation.

4. A motor according to claim 1 in which the bearing for the rotor shaft is carried in a bearing support bracket, said bearing support bracket having a pair of bosses respectively supported on said shafts and which also serve to maintain the assembly of stator laminations.

5. A motor according to claim 1 in which the motor has two separate stators, assembled in tandem and each stator comprising laminated plates, said shafts extending through and projecting from opposite sides of the assembled stators, said rotor shaft extending through and projecting from opposite sides of the assembled stators parallel to said shafts, a pair of bearing brackets one at each opposite side of the stator assembly and each presenting a bearing receiving the rotor shaft, and each of said bearing brackets having a pair of bosses supported on said shafts and pressed tightly against the stator assembly.

6. A motor according to claim 1 in which the coil structure comprises a bobbin having separate spaced apart end sections each including a substantially U-shaped sleeve with a wall of predetermined thickness, and a wire wound about the outer surfaces of the sleeve walls to afford the coil, the inner surfaces of said sleeve walls defining a core opening of the core, and the core of the stator being inserted in said opening.

7. A motor according to claim 1 on which the stator has a core portion embraced by the windings of the coil, the coil windings being spaced concentrically of the stator core to allow for air cooling.

8. A motor according to claim 7 which includes a baffle positioned to divert a stream of air to the bearing to cool the bearing.

9. A motor according to claim 6 in which there is a second stator spaced axially from the first stator, the two stators each having a core embraced by the windings of a single coil spaced concentrically from each core.

References Cited

UNITED STATES PATENTS

| | | | |
|---|---|---|---|
| 2,786,953 | 3/1957 | Schaefer | 310—166 |
| 2,844,052 | 7/1958 | Stoeckicht | 74—411 X |
| 3,163,791 | 12/1964 | Carlson | 310—112 X |
| 3,167,967 | 2/1965 | Silberger | 74—411 |
| 3,168,663 | 2/1965 | Baclawski | 310—90 |
| 3,210,581 | 10/1965 | Jakel | 310—90 |
| 3,244,020 | 4/1966 | Breuer | 74—411 |
| 3,413,501 | 11/1968 | Dotto | 310—172 X |

WARREN E. RAY, Primary Examiner

R. SKUDY, Assistant Examiner

U.S. Cl. X.R.

74—409, 411, 665; 310— 51, 90, 112, 258